(12) United States Patent
Kawamoto et al.

(10) Patent No.: US 8,595,350 B2
(45) Date of Patent: Nov. 26, 2013

(54) USER INFORMATION PROCESSING UNIT, USER INFORMATION PROCESSING SYSTEM, TERMINAL UNIT, APPARATUS AND METHOD FOR PROVIDING INFORMATION

(75) Inventors: Yoji Kawamoto, Tokyo (JP); Isao Hidaka, Tokyo (JP); Tomohiro Tsunoda, Tokyo (JP)

(73) Assignee: Sony Corporation, Tokyo (JP)

( * ) Notice: Subject to any disclaimer, the term of this patent is extended or adjusted under 35 U.S.C. 154(b) by 452 days.

(21) Appl. No.: 12/826,878

(22) Filed: Jun. 30, 2010

(65) Prior Publication Data

US 2010/0268685 A1 Oct. 21, 2010

Related U.S. Application Data

(63) Continuation of application No. 09/594,284, filed on Jun. 15, 2000, now abandoned.

(30) Foreign Application Priority Data

Jun. 28, 1999 (JP) .................................... 11-182516

(51) Int. Cl.
*G06F 15/173* (2006.01)

(52) U.S. Cl.
USPC ........................................................ 709/224

(58) Field of Classification Search
None
See application file for complete search history.

(56) References Cited

U.S. PATENT DOCUMENTS

| | | |
|---|---|---|
| 5,710,884 A | 1/1998 | Dedrick |
| 5,717,923 A | 2/1998 | Dedrick |
| 5,872,588 A | 2/1999 | Aras et al. |
| 6,343,287 B1 | 1/2002 | Kumar et al. |
| 6,460,036 B1 | 10/2002 | Herz |
| 6,513,039 B1 | 1/2003 | Kraenzel |
| 6,751,459 B1 | 6/2004 | Lee et al. |
| 6,754,665 B1 | 6/2004 | Futagami et al. |

FOREIGN PATENT DOCUMENTS

| | | |
|---|---|---|
| JP | 05-324526 | 7/1993 |
| JP | 05-250336 | 9/1993 |
| JP | 07-30631 | 11/1995 |
| JP | 10-320413 | 4/1998 |
| JP | 10-334050 | 12/1998 |
| JP | 10-335169 | 12/1998 |
| JP | 11-110452 | 4/1999 |
| JP | 11-126184 | 5/1999 |
| JP | 11-134345 | 5/1999 |

OTHER PUBLICATIONS

Japanese Office Action issued on Jun. 7, 2011 in connection with counterpart JP Application No. 11-182516.

*Primary Examiner* — Scott Christensen
(74) *Attorney, Agent, or Firm* — Dentons US LLP

(57) ABSTRACT

A user information processing method, an apparatus thereof and a user information processing system in which personal information can be more effectively employed. Terminal use record information is obtained when a user employs terminal units. The profile information of the user is generated on the basis of the accumulated terminal use record information and the generated profile information is stored, so that information peculiar to the user can be provided on the basis of the stored profile information of the user.

11 Claims, 14 Drawing Sheets

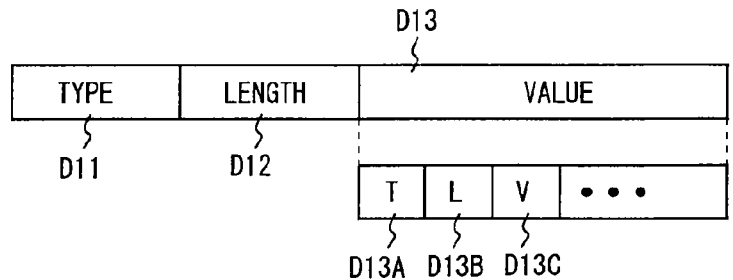

```
00 : NETWORK CONNECTION INFORMATION    CERTIFIED ID, PASSWORD···
01 : NETWORK ADDITIONAL INFORMATION    GROUP ID, PASSWORD
02 : PERSONAL INFORMATION              TELEPHONE DIRECTORY DATA, ADDRESS
                                       BOOK DATA, SCHEDULE DATA···
03 : INFORMATION FOR EACH TERMINAL     ATTRIBUTES OF TERMINALS SUCH AS
                                       TELEVISION, PC, CELLULAR PHONE, ETC.
                                       ATTRIBUTES OF MEDIA SUCH AS TEXT,
                                       STATIC IMAGE, MOVING IMAGE, VOICE,
                                       MUSIC, ETC. FORMATS SUCH AS HTML, GIF.
                                       JPEG, MPEG, MP3, ATRAC, ETC.
04 : USE INFORMATION AND PROFILE       USE RECORD, PROFILE INFORMATION
     INFORMATION
```

FIG. 4

CONCERNING COMPONENTS
SERVICE PROVIDING FUNCTION: 1
BEHAVIORAL PATTERN ANALYSIS SERVER: 2 WHEN 2 IS DIVIDED INTO TWO AND WRITTEN, A BEHAVIORAL PATTERN FORMING FUNCTION IS DESIGNATED BY 2' AND A BEHAVIOR PREDICTING FUNCTION IS DESIGNATED BY 2".
BEHAVIORAL PATTERN: 3
POSITION LOG: 4
POSITION SPECIFYING FUNCTION: 5
CONFIGURATION PATTERN
SERVICE PROVIDER

| | SERVICE PROVIDER | COMMUNICATIONS COMPANY | TERMINAL UNIT | MERITS |
|---|---|---|---|---|
| CONFIGURATION PATTERN 1 | 1 | 2, 3, 4 | 5 | •SERVICE CAN BE PROVIDED FROM PROVIDER<br>•STORAGE DEVICE DOES NOT NEED TO BE MOUNTED ON TERMINAL SIDE |
| CONFIGURATION PATTERN 2 | 1 | 2, 3, 4 | 5 | •SERVICE CAN BE PROVIDED FROM PROVIDER<br>•LOG CAN BE COLLECTED EVEN OFF LINE ON TERMINAL SIDE |
| CONFIGURATION PATTERN 3 | 1 | 2, 3, 4, 5 | | •SERVICE CAN BE PROVIDED FROM PROVIDER<br>•SPECIAL DEVICES AND FUNCTIONS ARE NOT REQUIRED ON TERMINAL SIDE |
| CONFIGURATION PATTERN 4 | 1, 2", 3 | 2', 3, 4 | 5 | •TRANSMISSION OF LOG TO PROVIDER SIDE IS NOT REQUIRED, AND SECURITY IS HIGH<br>•SERVICE CAN BE PROVIDED FROM PROVIDER |
| CONFIGURATION PATTERN 5 | 1, 2, 3, 4 | | 5 | •EVEN WHEN A PLURALITY OF COMMUNICATIONS COMPANIES ARE PRESENT, COMMON BEHAVIORAL PATTERN CAN BE CREATED AND USED<br>•SERVICE CAN BE PROVIDED FROM PROVIDER<br>•WHEN PROVIDER PROVIDES SERVICE, CONNECTION TO COMMUNICATIONS COMPANY IS NOT REQUIRED EVERY TIME (BECAUSE OF HAVING BEHAVIORAL PATTERN IN SERVER ITSELF) |
| CONFIGURATION PATTERN 6 | 1 | | 2, 3, 4, 5 | •SECURITY IS HIGH<br>•APPLICATIONS USING BEHAVIORAL PATTERN ON TERMINAL UNIT SIDE CAN BE EMPLOYED |

FIG. 17

USER INFORMATION PROCESSING UNIT, USER INFORMATION PROCESSING SYSTEM, TERMINAL UNIT, APPARATUS AND METHOD FOR PROVIDING INFORMATION

RELATED APPLICATION DATA

This application is a continuation of U.S. patent application Ser. No. 09/594,284, filed Jun. 15, 2000, the entirety of which is incorporated herein by reference to the extent permitted by law. The present application also claims priority to Japanese Patent Application No. 11-182516 filed in the Japanese Patent Office on Jun. 28, 1999.

BACKGROUND OF THE INVENTION

The present invention relates to a user information processing unit, a user information processing system, a terminal unit, an information provider and a method for providing information, and more particularly, is suitably applied to a user information processing unit, a user information processing system, a terminal unit, an information provider and a method for providing information, in which the profile information of a user employing various kinds of terminal units is generated.

DESCRIPTION OF THE RELATED ART

In a system which supplies characteristic information to a user by using the personal information of the user who employs a terminal unit, the accumulating means of the information has been hitherto provided in either a provider side as information providing means or a terminal side as information receiving means.

In the case where the provider side has personal information, a user needs to provide the personal information for each provider or its service. Therefore, when the user utilizes a new personal information using service, he needs to re-transmit the personal information to the provider. Further, in the case where the provider side accumulates the personal information, it needs to store the security thereof. Still further, in the case where the provider side accumulates the personal information, when terminal unit tries to employ the personal information, the terminal unit needs to be connected to the provider every time and receive the personal information. Still further, in the case where the provider side accumulates the personal information, when the user changes the provider, this change has made it difficult to us the personal information which has been accumulated.

As described above, in the case where the personal information is accumulated in the provider side, the accumulation has caused problems in that it becomes inconveniently necessary to ensure the security of the personal information and perform troublesome processing depending on use methods.

Still further, in the case where the personal information is accumulated in the terminal unit side, when the user changes the terminal unit employed by himself, the change has caused problems in that it becomes difficult to use the personal information which has been accumulated.

SUMMARY OF THE INVENTION

In view of the foregoing, an object of the present invention is to provide a user information processing unit, a user information processing system, a terminal unit, an information provider and a method for providing information capable of more effectively employing personal information.

The foregoing object and other objects of the invention have been achieved by the provision of a user information processing unit, a terminal unit, an information provider in which terminal use record information upon use of a terminal unit by a user is accumulated, the profile information of the user is produced on the basis of the accumulated terminal use record information and the produced profile information is stored, so that information peculiar to the user can be provided on the basis of the profile information of the user thus stored.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIG. 4 is a schematic view showing the data format of the memory card;

FIG. 17 is a schematic view showing effects in respective arrangement examples of the components.

DETAILED DESCRIPTION OF THE EMBODIMENT

Figure 1:
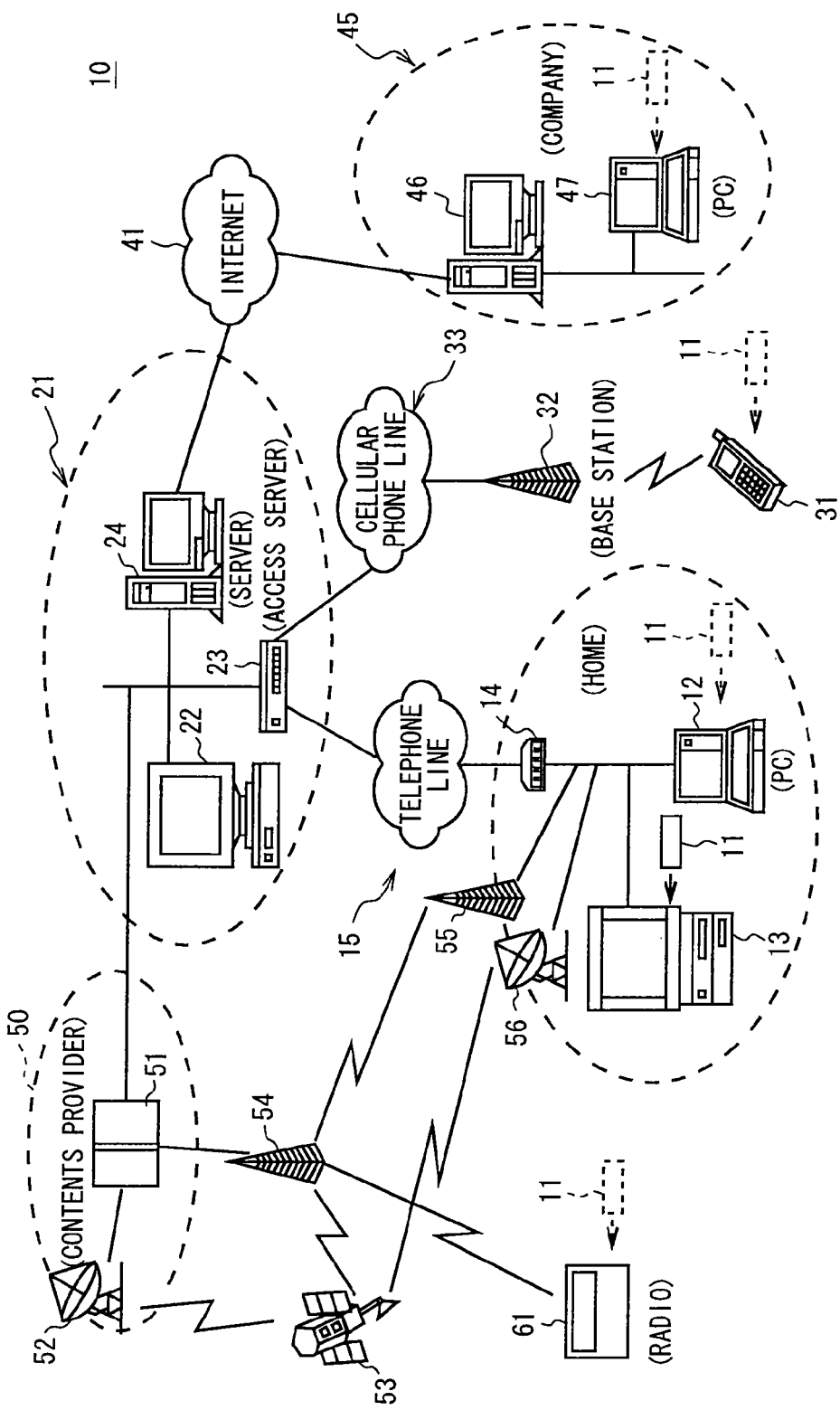
FIG. 1 is a schematic connection diagram showing the entire configuration of a network system using a user information processing unit according to the present invention.

Preferred embodiments of this invention will be described with reference to the accompanying drawings:

In FIG. 1, reference numeral 10 generally denotes a network system. A service provider 21 is connected to a telephone line 15 and a cellular phone line 33 through an access server 23.

To the telephone line 15, a television set 13 and a personal computer (PC) 12 as terminal units are connected through a modem 14. The television set 13 and the personal computer 12 can have access to the service provider 21 through the telephone line 15. Further, to the cellular phone line 33, a cellular phone 31 is connected through a base station 32. The cellular phone 31 can have access to the service provider 21 through the cellular phone line 33.

In addition thereto, the service provider 21 is connected to an Internet 41 through a server 24. A network 45 composed of the Local Area Network (LAN) of, for instance, a company or the like connected to the Internet 41 by a private line can have access to the service provider 21 through the Internet 41. In this case, the personal computer 47 of the network 45 is connected to the Internet 41 through a fire wall 46, hence a third party is prevented from externally invading the network 45.

Still further, to the service provider 21, connected is a contents provider 50 designed to transmit various kinds of information. Broadcasting signals transmitted from the contents provider 50 are supplied to a variety of terminal units through antennas 52, 54, 55 and 56 and a satellite 53.

Figure 2:
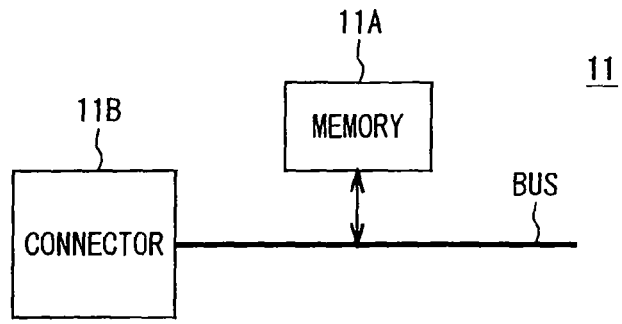
FIG. 2 is a block diagram showing the configuration of a memory card.

Here, each of the terminal units (the television set 13, the personal computers 12 and 47, the cellular phone 31 and a broadcasting radio receiver 61) is provided with a slot on which a memory card of a Personal Computer Memory Card International Association (PCMCIA) standard as storing means is mounted. When a user operates these terminal units, he mounts a memory card 11 individually possessed by himself on the terminal unit operated by him. The memory card 11 comprises, as shown in FIG. 2, a connector 11B mounted on the slot of each terminal unit and a memory 11A connected to the connector 11B through a bus.

Figure 3:
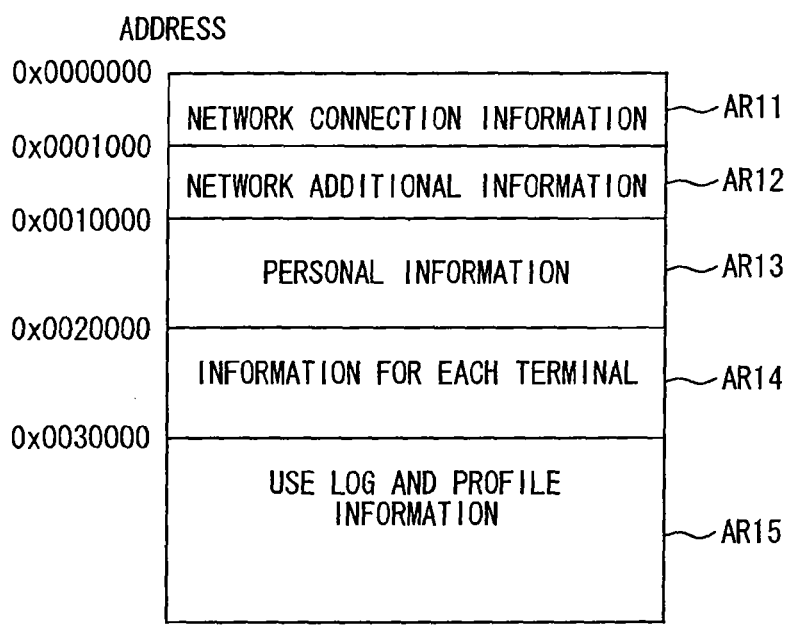
FIG. 3 is a schematic view showing the memory map of the memory card.

The memory 11A is adapted to store various pieces of information peculiar to the user having the memory card 11 in areas designated by a memory map shown in FIG. 3. More specifically, a first area AR11 of the storing areas of the memory 11A is an area for storing network connection information for connecting the terminal unit with the memory card 11 mounted to the network, and is designed to store a user ID and a password to be certified by the service provider 21 and a password for identifying the user which is previously registered by the user employing the memory card 11. The password for identifying the user indicates information to be compared with a password inputted by the user every time the user mounts the memory card 11 on the terminal unit, and is employed in order to decide whether or not the user at that time is a proper user who employs the memory card 11.

Further, a second area AR12 is an area for storing additional information down-loaded when a variety of services (provision of information, etc.) are received on the network from, for instance, the service provider 21 by utilizing the terminal unit on which the memory card 11 is mounted.

Still further, a third area AR13 is an area for storing information inherent in the user having the memory card 11 such as an address book, schedule data, etc.

Still further, a fourth area AR14 is an area for storing usable information for each terminal unit with the memory card 11 mounted. For instance, a television program schedule used when the terminal unit on which the memory card 11 is mounted is the television set 13, Uniform Resource Locator (URL) information for viewing an explanation on the World Wide Web (WWW) for each television program, a sentence being edited which is read and written, a screen or data such as a program which is being developed when the terminal unit on which the memory card 11 is mounted is the personal computer 12, or the data of a character mail service, etc. transmitted and received when the terminal unit with the memory card 11 mounted is the cellular phone 31 are respectively stored therein.

Still further, a fifth area AR15 is an area for storing us log information indicative of use record when the user having the memory card 11 employs the terminal unit by mounting the memory card 11 thereon and a result obtained by analyzing profile information indicative of the tendency of taste of the user or the like having the memory card 11 on the basis of the use log information in the profile analysis server 22 of the service provider 21.

Data stored in the memory 11A of the memory card 11 is stored in a Type Length Value (TLV) form shown in, for example, in FIG. 4. This format is indicative of the format of data stored in the respective areas (AR11 to AR15) of the memory map described above with reference to FIG. 3. The stored data comprises type information D11, data length information D12 and value information D13 for each area (AR11 to AR15).

In this case, as the type information D11 of the data of the first area AR11 of the memory 11A, a code "00" representing network connection information is assigned. As the value information D13 of the first area AR, information such as a user ID and a password, etc. is stored. Then, the format of a TLV form is further generated for each of the user IDs or the passwords stored as the value information D13 and respectively forms type information D13A, data length information D13B and value information D13C.

Further, in the second area AR12 of the memory 11A, a code "01" representing network additional information is assigned as the type information D11 of the data. As the value information of the second area AR12, is stored information such as a group ID and the password thereof as additional information down-loaded when various kinds of services (provision of information or the like) are received on the network from the service provider 21 or the contents provider 50. The group ID is identifying information utilized when a plurality of users employing the terminal unit form a specific group. Then, the format of a TLV form is further generated for each of group IDs and passwords thereof stored as the value information D13 and respectively forms type information D13A, data length information D13B and value information D13C.

Still further, in the third area AR13 of the memory 11A, a code "02" expressing personal information is assigned as the type information D11 of data. As the value information of the third area AR13, information such as the data of telephone directory, address book data and personal schedule data, etc. which are peculiarly employed by the user having the memory card 11 is stored. Then, the format of a TLV form is further generated for each of the data of the telephone directory, address book data and the personal schedule data, etc. and respectively forms type information D13A, data length information D13B and value information D13C.

Still further, in the fourth area AR14 of the memory 11A, as the type information D11 of data, a code "03" representing information for each terminal is assigned. As the value information of the fourth area AR14, information such as the attributes of various kinds of terminal units is stored as information used for each terminal unit on which the memory card 11 is mounted. Then, the format of a TLV form is further generated for each information such as the attributes of various kinds of terminal units stored as the value information D13, and respectively forms type information D13A, data length information D13B and value information D13C.

Furthermore, in the fifth area AR15 of the memory 11A, the use log and profile information are accumulated as the type information D11. Then, the format of a TLV form is further generated for each of the various kinds of data stored as the value information D13, and respectively forms type information D13A, data length information D13B and value information D13C.

Figure 5:
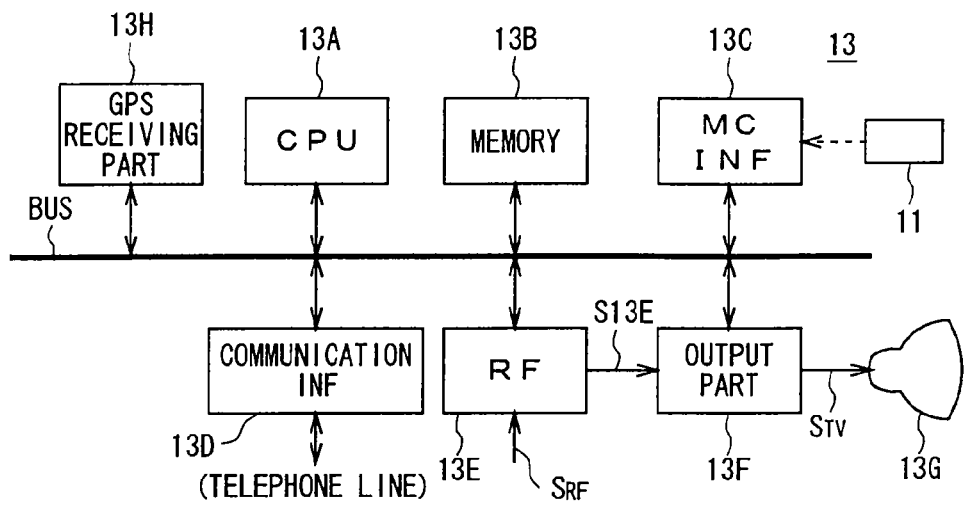
FIG. 5 is a block diagram showing the configuration of a television set.

Here, as a first terminal unit, the television set 13 comprises, as shown in FIG. 5, a CPU 13A, a memory 13B, a memory card (MC) interface (INF) 13C, a communication interface (INF) 13D, a receiving circuit part (RF) 13E, an output part 13F and a GPS receiving part 13H which are connected to a data bus. The CPU 13A is adapted to carry out various kinds of operations in accordance with operation programs stored in the memory 13B and to control the respective circuit parts in accordance with the operations.

The Radio Frequency (RF) part 13E receives a television broadcast wave $S_{RF}$ received by an antenna (not shown) and transmits a receiving signal 513E thus received to the output part 13F. The output part 13F applies an intermediate frequency amplification processing and an image detection processing or the like to the receiving signal 513E to generate a television video signal $S_{TV}$ and transmit it to a Cathode Ray Tube (CRT) display 13G. Thus, the television broadcast received by the RF part 13E is visually displayed on the display screen of the CRT 13G.

Further, the GPS receiving part 13H is adapted to specify the position of the television set 13 on the basis of the correlation of signals transmitted from a plurality of satellites.

In this case, when the user operating the television set 13 mounts the memory card 11 possessed by himself on a slot (not shown) for the memory card, the memory card interface 13C is brought to a state in which it can transmit and receive various kinds of data from and to the memory card 11. The memory card interface 13C is composed of a serial interface and has at least three data lines. The first data line transmits a clock signal upon transmission of data. The second data line transmits a status signal necessary for transmission of data. The third data line transmits serially data to be written in or read from the memory card 11.

Then, the CPU 13A accumulates the attribute information of a program included in a program viewed by the user and time thereof and a program broadcasting signal while the memory card 11 is mounted on the slot, the identifying information and positional information of the television set 13, or the like in the fifth area AR15 (FIG. 3) of the memory 11A of the memory card 11 as use record information (use log).

Figure 6:
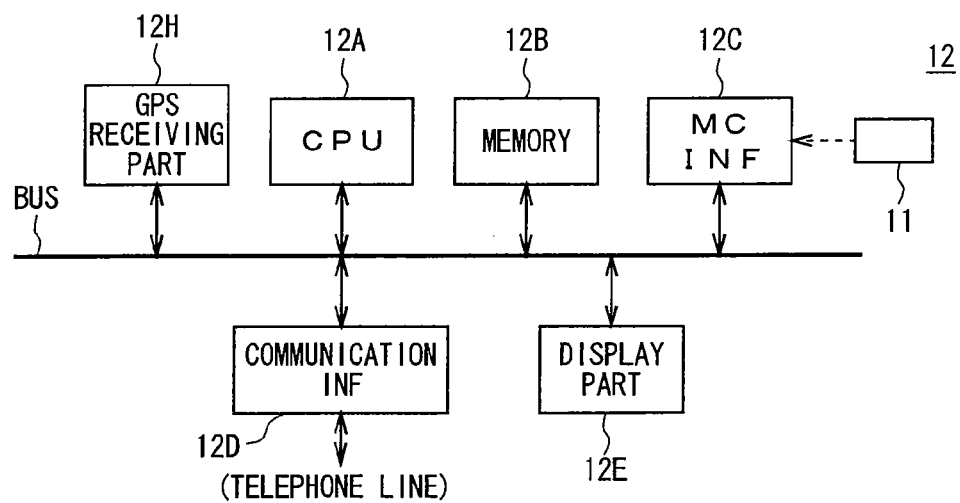
FIG. 6 is a block diagram showing the configuration of a personal computer.

As a second terminal unit, the personal computer 12 comprises, as shown in FIG. 6, a CPU 12A, a memory 12B, a memory card (MC) interface (INF) 12C, a communication interface (INF) 12D, a display part 12E and a GPS receiving part 12H which are connected to a data bus. The CPU 12A is adapted to perform various kinds of operations in accordance with operation programs stored in the memory 12B and to control the respective circuit parts in accordance with the operations. A variety of processing contents of the CPU 12A are displayed on the display part 12E composed of a liquid crystal display panel or the like.

Further, the GPS receiving part 12H is adapted to specify the position of the personal computer 12 on the basis of the correlation of signals transmitted from a plurality of satellites.

Then, while the memory card 11 is mounted on the slot, the CPU 12A accumulates Internet search information obtained by the user who has access to the Internet, the time thereof, the attribute of the search information included in the received search information, the identifying information and positional information of the personal computer 12 or the like in the fifth area AR 15 (FIG. 3) of the memory 11A of the memory card 11 as the use record information (use log).

Further, the personal computer 47 connected to the network 45 configured in the company or the like has a configuration similar to that of the personal computer 12 described above with reference to FIG. 6. The CPU of the personal computer 47 accumulates Internet search information to which the user has access while the memory card 11 is mounted on the slot, the time thereof, the attribute of the information included in the received search information, the identifying information and positional information of the personal computer 47, etc. in the fifth area AR 15 (FIG. 3) of the memory 11A of the memory card 11 as the use record information (use log).

Figure 7:
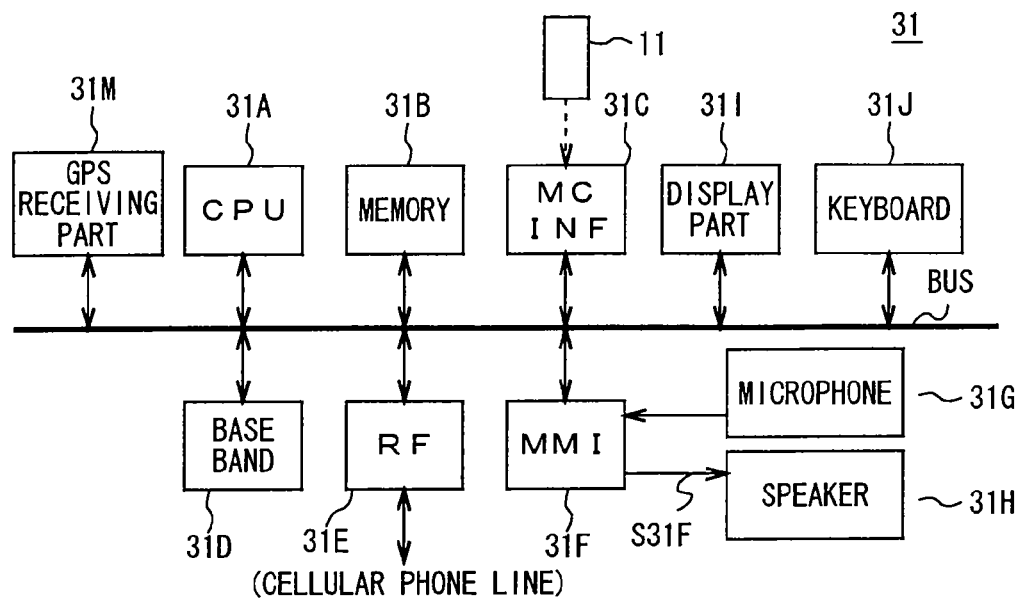
FIG. 7 is a block diagram showing the configuration of a cellular phone.

Further, as a third terminal unit, the cellular phone 31 comprises, as shown in FIG. 7, a CPU 31A, a memory 31B, a memory card (MC) interface (INF) 31C, a transmitting and receiving circuit part (RF) 31E for transmitting and receiving a signal between a cellular phone line 33 and it, a base band processing part 31D for converting a Radio Frequency (RF) signal received in the transmitting and receiving circuit part 31E into a base band signal and converting the base band signal to be transmitted into an RF signal, a Man Machine Interface (MMI) part 31F as the interface of a microphone 31G and a speaker 31H, a display part 31I, a keyboard 31J and a GPS receiving part 31M which are connected to a data bus.

The CPU 31A is designed to execute various kinds of operations on the basis of operation programs stored in the memory 31B and to control respective circuit parts in accordance with the operations. The contents of various types of operations of the CPU 31A are displayed on the display part 31I composed of a liquid crystal display panel or the like as required.

Further, the GPS receiving part 31M is designed to specify the position of the cellular phone 31 on the basis of the correlation of signals transmitted from a plurality of satellites.

When the user inputs the telephone number of a desired called party, the keyboard 31J transmits data indicating the telephone number to the CPU 31A. The CPU 31A transmits a connection request to the called party represented by the telephone number inputted by the user through the transmitting and receiving circuit part 31E. At this time, the cellular phone line 33 connects a line to the called party in accordance with the response of the called party. When the line is connected to the called party, the transmitting and receiving circuit part 31E supplies an RF signal received from the called party through an antenna (not shown) to the base band processing part 31D in which the RF signal is converted into the base band signal. The base band processing part 31D supplies the base band signal thus converted to the MMI part 31F, so that an audio signal received from the called party is outputted from the speaker 31H as a voice.

Further, when the user inputs the voice through the microphone 31G, the MMI part 31F supplies the input audio signal supplied from the microphone 31G to the base band processing part 31D in which the base band signal is converted into the RF signal. Then, the base band processing part 31D transmits the converted RF signal to the cellular phone line 33 through the transmitting and receiving circuit part 31E to transmit the RF signal to the called party to which the line is connected. Thus, the user employing the cellular phone 31 can transmit and receive various dialogue or information between the called party and the user.

Then, while the memory card 11 is mounted on the slot, the CPU 31A accumulates a party called by the user, the contents of an information providing service used by the user, the time thereof, the attribute of the information included in actually received provided information, the identifying information and positional information of the cellular phone 31 or the like in the fifth area AR15 (FIG. 3) of the memory 11A of the memory card 11 as the use record information (use log).

Figure 8:
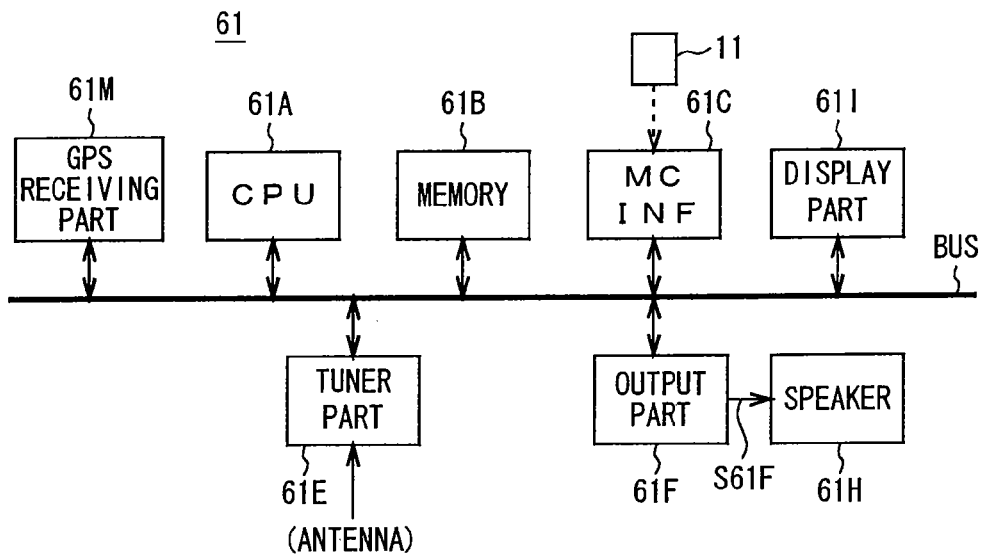
FIG. 8 is a block diagram showing the configuration of a broadcasting radio receiver.

Further, as a fourth terminal unit, a broadcasting radio receiver 61 has, as shown in FIG. 8, a configuration in which a CPU 61A, a memory card (MC) interface 61C, a display part 611, a tuner part 61E, an output part 61F, a speaker 61H and a GPS receiving part 61M are connected to a data bus.

The CPU 61A is adapted to control respective circuit parts in accordance with programs stored in the memory 61B, the tuner part 61E converts a signal of a frequency band selected by the user from among radio broadcasting signals received through an antenna (not shown) into an intermediate frequency signal, applies a signal detection processing thereto and supplies the obtained signal to the output part 61F. The output part 61F amplifies the broadcasting signal obtained by the tuner part 61E to a prescribed level and transmits an audio signal S61F thus amplified to the speaker 61H. Thus, a voice transmitted as the radio broadcasting signal is outputted from the speaker 61H.

Further, the GPS receiving part 61M is adapted to specify the position of the broadcasting radio receiver 61 on the basis of the correlation of signals transmitted from a plurality of satellites.

Then, with the memory card 11 mounted, the CPU 61A accumulates the attribute information of radio programs included in the radio program selected by the user, the time thereof and radio broadcasting signals, the identifying information and positional information of the broadcasting radio receiver 61, etc. in the fifth area AR15 (FIG. 3) of the memory 11A of the memory card 11 as the use record information (use log).

As described above, the user mounts the memory card 11 peculiar to the user on each of the terminal units (the personal computers 12 and 47, the television set 13, the cellular phone 31 and the broadcasting radio receiver 61) and employs these terminal units, so that each terminal unit writes its use log in the memory card 11.

Therefore, the use record in each terminal unit is accumulated in the memory card 11 peculiar to the user as the use log. Then, each terminal unit transmits the use log and the past profile information of the memory card 11 to the profile analysis server 22 of the service provider 21 through the telephone line 15 every prescribed timing, together with a user ID as the network connection information described above with reference to FIG. 3. At this time, each terminal unit transmits terminal type data previously stored in the memory of the terminal unit, information for specifying transmitting means and information for specifying the terminal composed of the telephone number of a transmitter in a terminal unit side to the profile analysis server 22.

In this connection, the personal computers 12 and 47 are designed to utilize a Transmission Control Protocol/Internet Protocol (TCP/IP) which is the general purpose protocol of the Internet in a communication with the service provider 21, or to further utilize a Point to Point Protocol (PPP) in the case where a communication line is the telephone line 15.

Further, the cellular phone 31 is designed to use a Dual Tone Multiple Frequency (DTMF) or a Wireless Application Protocol (WAP).

Still further, the broadcasting radio receiver 61 is not provided with means for transmitting information. Therefore, after the use record (use log) in the broadcasting radio receiver 61 is stored in the memory card 11, it is transmitted to the profile analysis server 22 at a prescribed timing when the memory card 11 is mounted on other terminal units.

Figure 9:
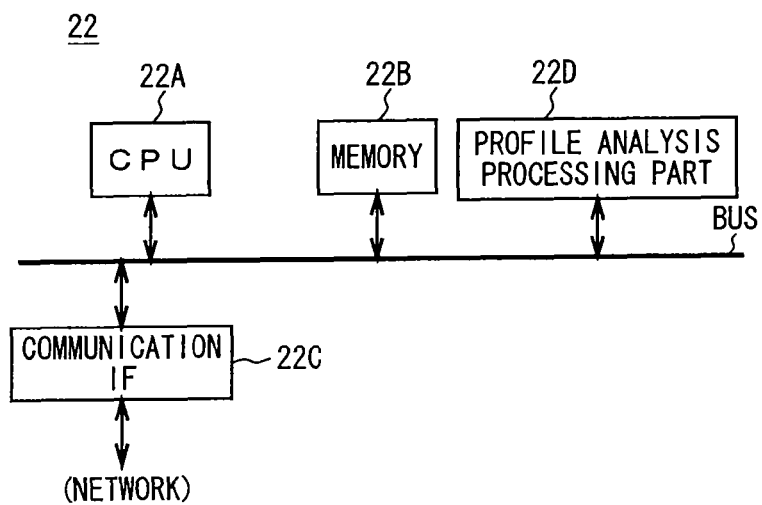
FIG. 9 is a block diagram showing the configuration of a profile analysis server.

As shown in FIG. 9, the profile analysis server 22 includes a CPU 22A, a memory 22B, a communication interface 22C and a profile analysis processing part 21D which are connected to a data bus. The CPU 22A is adapted to control respective circuit parts in accordance with programs stored in the memory 22B.

Specifically, the CPU 22A of the profile analysis server 22 stores use log and past profile information in the memory card 11 transmitted from the terminal units (the personal computers 12 and 47, the television set 13 or the cellular phone 31) on which the memory card is mounted in the profile analysis processing part 21D, and then generates new profile information on the basis of the use log and the past profile information.

Figure 10:
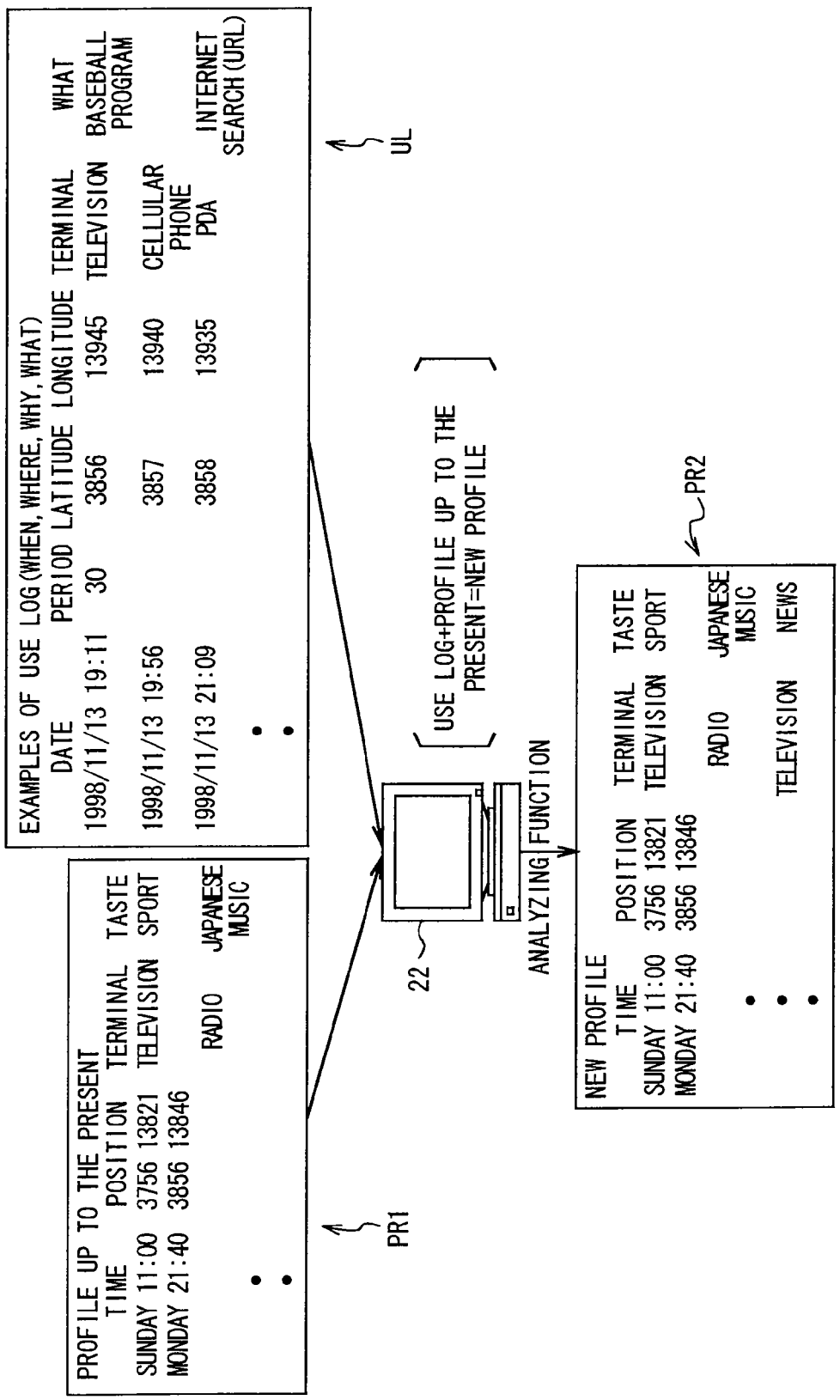
FIG. 10 is a schematic view for explaining a profile forming process.
Figure 11:
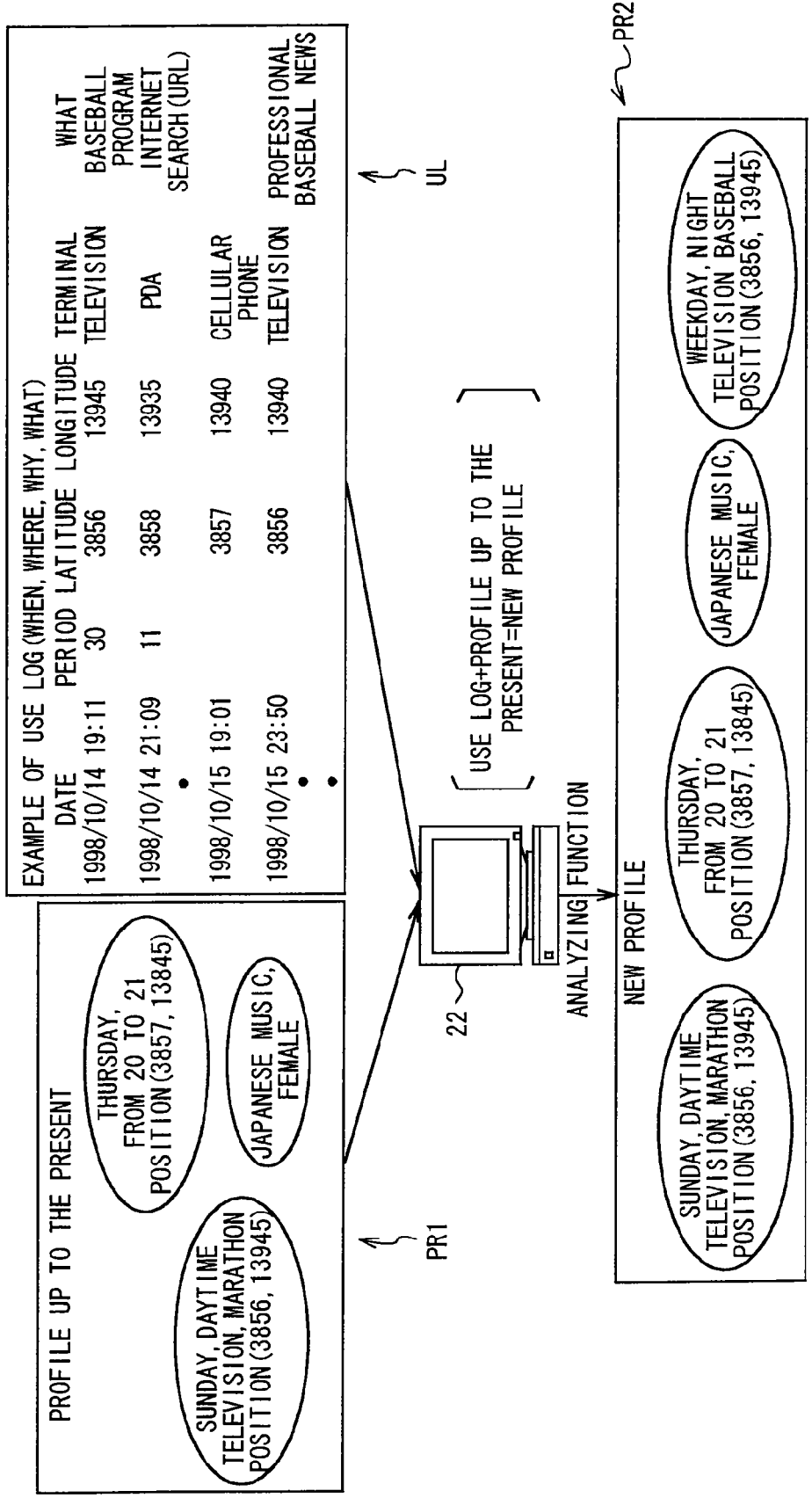
FIG. 11 is a schematic view for explaining a profile forming process.

In this case, as shown in FIGS. 10 and 11, the use log UL represents the use record information of the terminal units written in the memory 11A of the memory card 11 when the memory card 11 is mounted on a variety of terminal units. Further, profile information up to that time (hereinafter referred to as past profile information) PRI is indicative of a result obtained from the previous analysis of the profile analysis server 22.

Then, the profile analysis processing part 21D adds the use log UL to the past profile information PR1 to form new profile information PR2. Thus, the CPU 22A returns the new profile information PR2 generated in the profile analysis processing part 22D to the terminal unit as its transmitter.

The CPU of the terminal unit overwrites the new profile information PR2 returned from the profile analysis server 22 on the memory 11A of the memory card 11 to write the new profile information PR2 in place of the past profile information PR1. At this time, the CPU of the terminal unit erases the use log written in the memory 11A of the memory card 11. Subsequently, the user accumulates the new use record of the terminal unit every time the user employs the terminal unit.

In such a manner, the user mounts the memory card 11 in which the new profile information PR2 is stored on desired terminal units (the personal computers 12 and 47, the television set 13, the cellular phone 31 or the broadcasting radio receiver 61) and employs the terminal unit. At this time, the CPU of the terminal unit is adapted to select provided information corresponding to the tendency of taste of the profile information (namely, the user having the memory card 11) from among various kinds of provided information transmitted from the service provider 21 or the contents provider 50.

More specifically, to the provided information transmitted form the service provider 21 or the contents provider 50, is added its attribute (genre) information. The CPU of the terminal unit selects the provided information, that the attribute information of which corresponds to the profile information stored in the memory card 11 from among the received provided information. Thus, the user selects and obtains the provided information so as to meet the taste of the user in the terminal unit without a troublesome operation that the user himself selects the provided information. Parenthetically, FIG. 11 shows the profile PR1 and the new profile PR2 of FIG. 10 in a different representation method.

Figure 12:
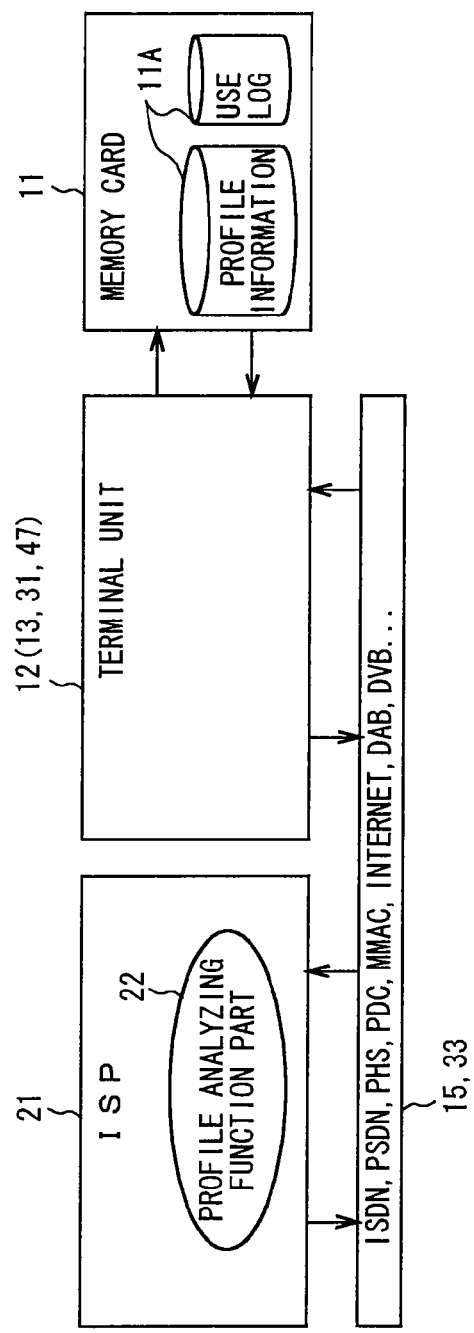
FIG. 12 is a block diagram showing the arrangement example of components according to an embodiment.

Further, FIG. 12 shows the arrangement of a storing part of the profile information and the use log and a profile analyzing function part in the network system 10. In this embodiment, the memory card 11 accumulates the profile information and the use log and the service provider 21 has the profile analysis server 22 as the profile analyzing function part.

In the network system 10, the profile information and the use log as personal information are accumulated in the memory card 11 personally possessed by the user. Thus, the leakage of these personal information is prevented.

In this connection, in the network system 10, are used codes which can be decoded only by both terminal units carrying out a communication. In a coding system, a secret key (common key) coding system or a public key coding system is employed.

The secret key coding system is a system for transmitting and receiving code data using the same key by a transmitting side and a receiving side. A key employed when the data is encoded is not opened. As specific examples thereof, a Data Encryption Standard (DES) or a triple DES is exemplified. These secret key systems effectively rapidly perform coding and decoding processing.

Further, the public key coding system uses two types of keys including the secret key and the public key to encode data. Specifically, there are exemplified systems such as RSA, RC2 or RC4, etc. In the public key coding system, when components (for instance, a service provider, a communications company and terminal units, etc.) are increased, the key can be effectively managed with ease.

In the above described configuration, when the user employs, for instance, the television set 13 or the personal computer 12 in his home, he mounts the memory card 11 owned by him on the television set 13 or the personal computer 12 and uses these terminal units. At this time, in the memory card 11, is accumulated the use log as the terminal use record of the user concerning the television set 13 or the personal computer 12.

Further, when the user makes use of the personal computer 47 of the company, he mounts the memory card 11 owned by him on the personal computer 47 to employ it. At this time, in the memory card 11, is accumulated the use log as the terminal use record of the user concerning the personal computer 47.

In such a way, the user mounts the memory card 11 on the terminal unit employed by the user, so that the use record of various terminal units is accumulated in the memory card 11 as the use log.

The use log accumulated over a variety of terminal units is indicative of information representing the tendency of information obtained by the user in various kinds of usual scenes. This information is transmitted to the profile analysis server 22 of the service provider 21 from the terminal unit at a prescribed timing when the user mounts the memory card 11 on any of the terminal units.

Every time the use log and the past profile are transmitted to the profile analysis server 22 from any terminal unit, the profile analysis server 22 generates new profile information from these pieces of information, immediately returns the newly generated profile information to the terminal unit as the transmitter and stores it in the memory card 11. Thus, the accuracy of the profile information of the memory card 11 is improved due to the increase of the number of times of use of the terminal unit by the user.

When new profile information is generated in the profile analysis server 22, the profile analysis server 22 does not leave the use log, the past profile information and the new profile, so that the use log or the profile as the personal information of the user is left in the memory card 11 owned by the user and the secret thereof is kept.

Further, each of the terminal units (the personal computers 12 and 47, the television set 13, the cellular phone 31 and the broadcasting radio receiver 61) is adapted to select and obtain provided information in accordance with the profile information of the memory card 11. Therefore, even when the user makes use of any terminal unit, the user mounts the memory card 11 in which the profile information is stored on the terminal unit so that he can get the information peculiar to the user.

As described above, the accumulating means (the memory 11A) of the use log obtained when the user employs the terminal unit and the profile information generated by the profile analysis server 22 and the profile analysis server 22 constitute the user information processing system and the accumulating means (the memory 11A) and the profile analysis server 22 are provided in separate devices (the memory card 11 and the service provider 21), hence the secrecy of information and the efficiency of information processing can be ensured.

Accordingly, in accordance with the above described configuration, an information providing system employing the personal information more effectively can be realized.

Further, the profile analysis server 22 is provided in the service provider 21 side, so that the size of the terminal unit can be prevented from being enlarged.

Figure 13:
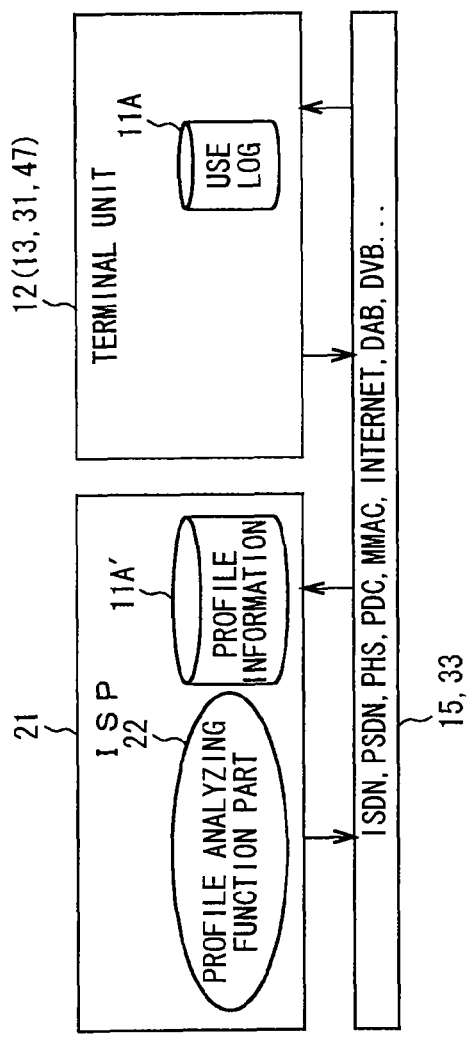
FIG. 13 is a block diagram showing the arrangement example of components according to another embodiment.
Figure 14:
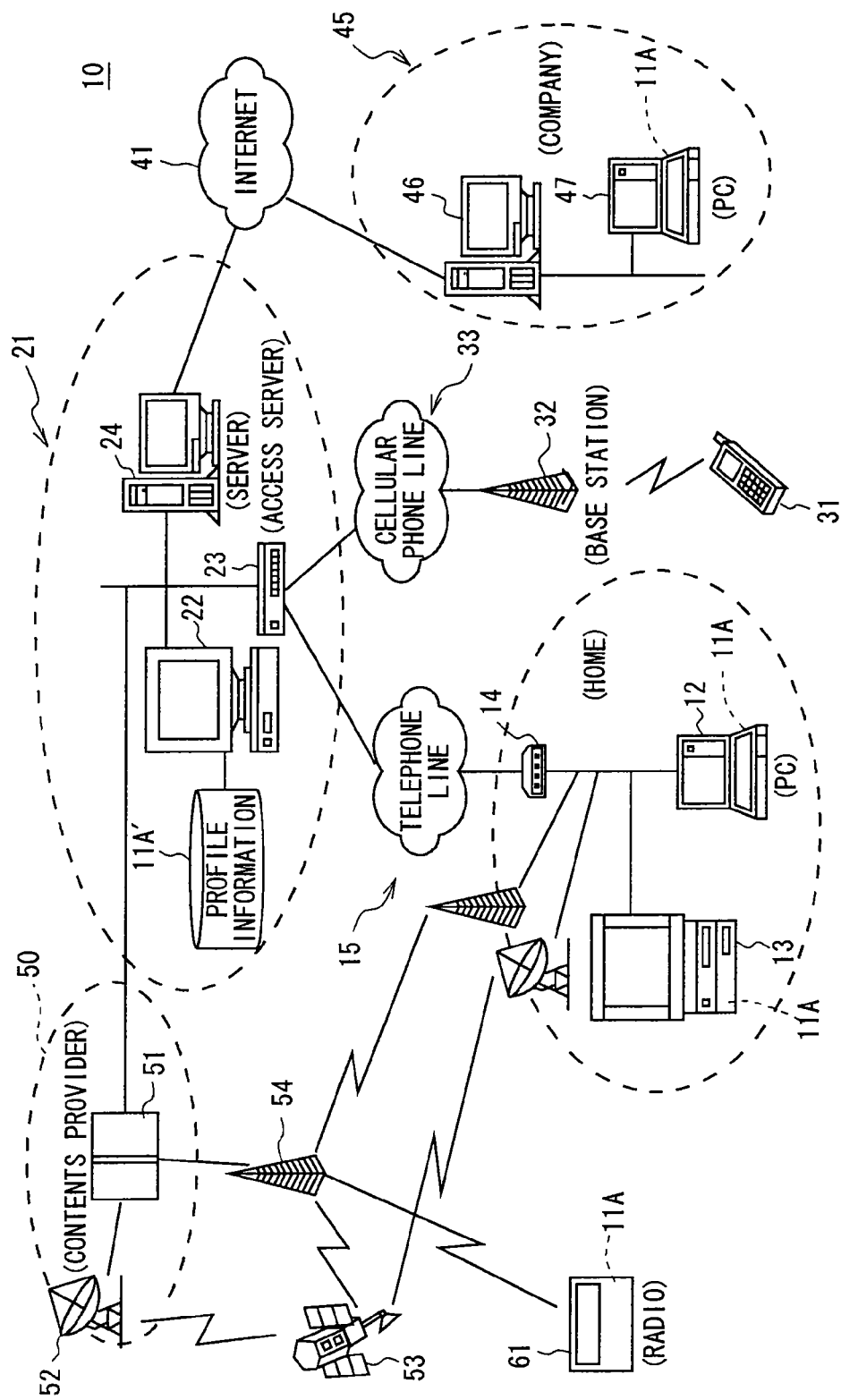
FIG. 14 is a schematic connection view showing the entire configuration of a network according to another embodiment.

In the above described embodiment, although there is described a case in which the memory card 11 is provided with a function for accumulating the use log and the profile information as shown in FIG. 12, it should be noted that the present invention is not limited thereto, and the service provider 21 can be provided with a function for accumulating the profile information and each terminal unit can have a function for accumulating the use log, as shown in FIG. 13. In this case, the memory card 11 for accumulating the use log and the profile information is not required and, for instance, a network system 10 as shown in FIG. 14 is configured.

In such a network system 10, a memory 11A for accumulating the use log is provided in each terminal unit. Use log when the user employs the terminal unit is accumulated in the memory 11A of the employed terminal unit.

Then, the terminal unit transmits the use log accumulated in the memory 11A to the profile analysis server 22 of a service provider 21 for every prescribed timing. The service provider 21 has a memory 11A' for storing profile information generated by the profile analysis server 22, generates new profile information on the basis of the use log transmitted form the terminal unit and past profile information stored in the memory 11A' and writes it in the memory 11A'.

In this case, a contents provider 50 reads out the necessary profile information of the user from the memory 11A' of the service provider 21 and transmits provided information according to the profile information (namely, provided information corresponding to the taste of the user) to a prescribed terminal unit on the basis of user information (employed terminal or the like) stored in the memory 11A' so as to meet the profile information.

Thus, the contents provider 50 can transmit the provided information corresponding to the taste of the user to the terminal used by the user.

Figure 15:
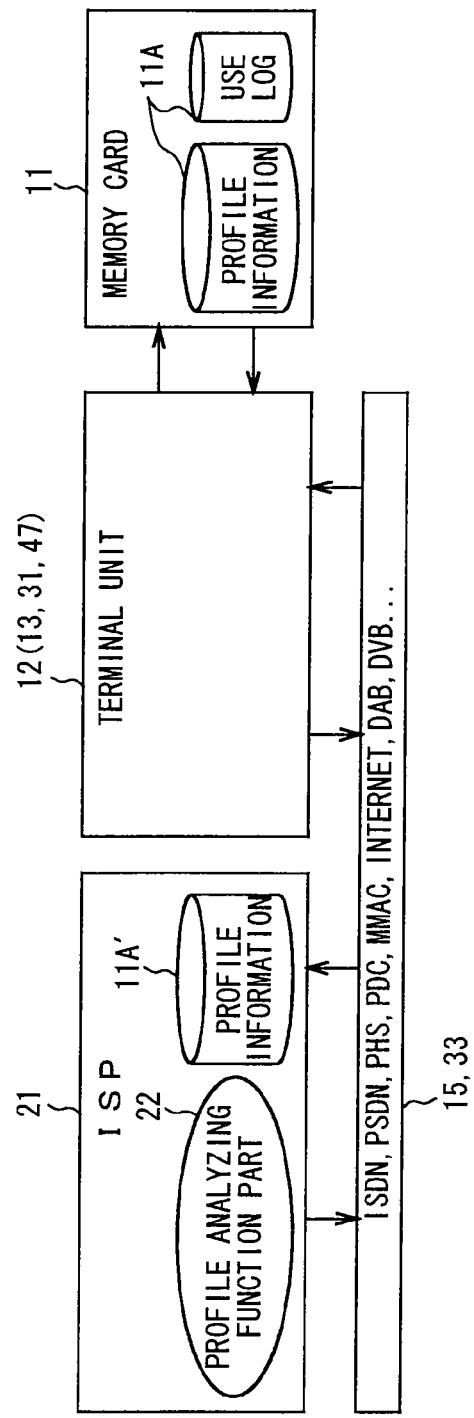
FIG. 15 is a block diagram showing the arrangement example of components according to another embodiment.
Figure 16:
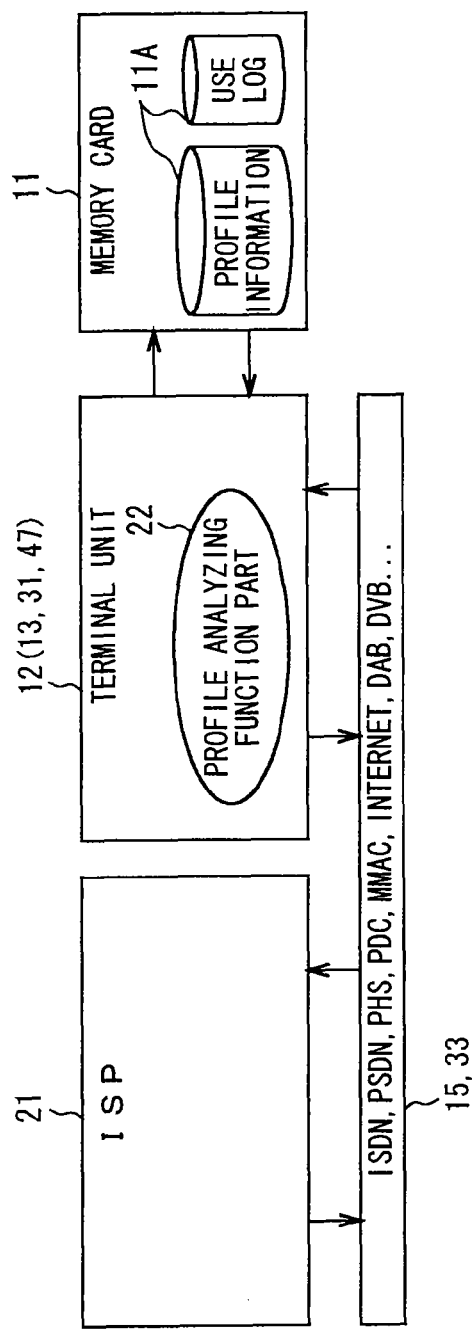
FIG. 16 is a block diagram showing the arrangement example of components of another embodiment.

Further, as shown in FIG. 15, the memories 11A and 11A' for storing the profile information can be provided in both the service provider 21 and the memory card 11, or a profile analysis processing part 22D can be provided in a terminal unit 12 (13, 31, 47) as shown in FIG. 16.

In this connection, FIG. 17 shows an effect in each of the arrangement examples of respective components (service providing function, behavioral pattern analysis server, behavioral pattern, position log and position specifying function).

In the above described embodiment, although the profile analysis server 22 is provided in the service provider 21, needless to say, the present invention is not limited thereto, and it can be provided in a variety of information providing means.

Further, in the above described embodiment, although there is described a case in which as means for accumulating the use log, the memory card 11 of a PCMCIA standard is employed, it should be noted that the present invention is not limited thereto, and other kinds of storing media such as other memory cards of various standards, stick shaped storing means, etc. can be applied thereto.

Still further, in the above described embodiment, although there is described a case in which the format storing means (the memory card 11) is detachably attached to the terminal unit, it should be recognized that the present invention is not limited thereto, and storing means (the accumulating means of the use log) can be incorporated in the terminal unit itself.

Still further, in the above described embodiment, although there is described a case in which the television set 13, the personal computers 12 and 47, the cellular phone 31 and the broadcasting radio receiver 61 are used as the terminal units, needless to say, the present invention is not limited thereto, and various kinds of terminal units such as a Personal Digital Assistant (PDA) in which for instance, the information of a schedule, a telephone directory, etc. can be viewed and read by itself or a car navigation system, etc. can be employed.

As mentioned above, according to the present invention, the terminal use record information obtained when the user employs the terminal unit is accumulated, the profile information of the user is generated on the basis of the accumulated terminal use record information and the generated profile information is stored, so that information peculiar to the user can be provided on the basis of the profile information of the user.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. An information processing system comprising:
   a plurality of terminal units each configured to accumulate terminal use record information of a given user when the given user uses the terminal unit;
   a profile analysis server; and
   a detachable storage unit associated with the given user, the storage unit being configured (i) to be detachably connected to each terminal unit when the given user uses the terminal unit and (ii) to store the terminal use record information accumulated by the terminal unit while the detachable storage unit is connected to the terminal unit, the terminal unit or another terminal unit including a transmitter configured to transmit the terminal use record information accumulated in the detachable storage unit to the profile analysis server,
   wherein,
      the profile analysis server is configured (i) to receive the terminal use record information accumulated in the detachable storage unit and transmitted by the terminal unit or by the other terminal unit when the detachable storage unit is connected to the other terminal unit and (ii) to generate profile information of the given user based on the accumulated terminal use record information, the profile analysis server returning the profile information of the given user generated at the profile analysis server to the transmitting terminal unit that stores the profile information of the given user in the detachable storage unit.

2. The information processing system of claim 1, wherein:
   the detachable storage unit stores a past profile information of the given user previously generated by the profile analysis server, and
   the profile analysis server generates a new profile information of the given user based on the accumulated terminal use record information and the past profile information transmitted to the profile analysis server, and returns the new profile information of the given user.

3. The information processing system of claim 1, wherein the detachable storage unit associated with the given user is a memory card individually possessed by the given user.

4. The information processing system of claim 1, wherein:
   the detachable storage unit includes a plurality of storing areas, and
   the storing areas include storing areas that respectively store information for each of the terminal units.

5. The information processing system of claim 4, wherein the terminal units include different kinds of terminal units.

6. The information processing system of claim 4, wherein the information includes attribute information of a respective terminal unit.

7. The information processing system of claim 1, wherein each of the terminal units includes a GPS receiving part, and the terminal use record information accumulated by the terminal unit while the detachable storage unit is connected to the terminal unit includes a respective positional information of the terminal unit.

8. The information processing system of claim 1, wherein:
   at least one of the terminal units is a broadcasting radio receiver that does not have the transmitter configured to transmit the terminal use record information accumulated in the detachable storage unit to the profile analysis server, and
   a terminal use record information accumulated by the broadcasting radio receiver and stored in the detachable storage unit while the detachable storage unit is connected to the broadcasting receiver is subsequently transmitted to the profile analysis server when the detachable storage unit is connected to a different terminal unit that has the transmitter configured to transmit the terminal use record information accumulated in the detachable storage unit to the profile analysis server.

9. The information processing system of claim 1, wherein the profile information of the given user stored in the detachable storage unit includes information indicative of a taste of the given user.

10. The information processing system of claim 1, wherein the terminal unit to which the detachable storage unit is connected selects information to be provided to the given user based on the profile information of the given user stored in the detachable storage unit.

11. The information processing system of claim 1, wherein the profile information of the given user is stored only in the detachable storage unit so as to maintain secrecy of information associated with the given user.

* * * * *